(12) United States Patent
Saito et al.

(10) Patent No.: US 11,486,018 B2
(45) Date of Patent: Nov. 1, 2022

(54) STEEL SHEET FOR TWO-PIECE CAN AND MANUFACTURING METHOD THEREFOR

(71) Applicant: JFE Steel Corporation, Tokyo (JP)

(72) Inventors: Hayato Saito, Tokyo (JP); Nobusuke Kariya, Tokyo (JP); Junichi Kitagawa, Tokyo (JP); Katsumi Kojima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 473 days.

(21) Appl. No.: 16/495,991

(22) PCT Filed: Mar. 12, 2018

(86) PCT No.: PCT/JP2018/009398
§ 371 (c)(1),
(2) Date: Sep. 20, 2019

(87) PCT Pub. No.: WO2018/180403
PCT Pub. Date: Oct. 4, 2018

(65) Prior Publication Data
US 2020/0102624 A1 Apr. 2, 2020

(30) Foreign Application Priority Data
Mar. 27, 2017 (JP) .............................. JP2017-060541

(51) Int. Cl.
| | | |
|---|---|---|
| B32B 15/09 | (2006.01) | |
| C21D 9/46 | (2006.01) | |
| B32B 15/18 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |

(52) U.S. Cl.
CPC .............. *C21D 9/46* (2013.01); *B32B 15/09* (2013.01); *B32B 15/18* (2013.01); *C21D 6/005* (2013.01); *C21D 6/008* (2013.01); *C21D 8/0205* (2013.01); *C21D 8/0226* (2013.01); *C21D 8/0247* (2013.01); *C22C 38/001* (2013.01); *C22C 38/002* (2013.01); *C22C 38/02* (2013.01); *C22C 38/04* (2013.01); *C22C 38/06* (2013.01)

(58) Field of Classification Search
None
See application file for complete search history.

(56) References Cited

U.S. PATENT DOCUMENTS

| | | |
|---|---|---|
| 5,587,027 A | 12/1996 | Tosaka et al. |
| 6,334,910 B1 | 1/2002 | Sato et al. |
| 10,174,393 B2 | 1/2019 | Suto et al. |
| 2014/0034195 A1 | 2/2014 | Suto et al. |
| 2017/0306436 A1* | 10/2017 | Saito et al. ............ C21D 9/46 |

FOREIGN PATENT DOCUMENTS

| | | |
|---|---|---|
| CN | 1118814 A | 3/1996 |
| CN | 1254767 A | 5/2000 |
| CN | 101400817 A | 4/2009 |
| CN | 103597110 A | 2/2014 |
| JP | 01184229 A | 7/1989 |
| JP | 01191764 A | 8/1989 |
| JP | 02141535 A | 5/1990 |
| JP | 0676618 B2 | 9/1994 |
| JP | 09249938 A | 9/1997 |
| JP | 1044318 A | 2/1998 |
| JP | 10280095 A | 10/1998 |
| JP | 11124654 A | 5/1999 |
| JP | 2000087145 A | 3/2000 |
| JP | 2001335888 A | 12/2001 |
| JP | 2002060900 A | 2/2002 |
| JP | 2003013146 A | 1/2003 |
| JP | 3899014 B2 | 3/2007 |
| JP | 2014208894 A | 11/2014 |
| TW | 201629242 A | 8/2016 |
| WO | 9963124 A1 | 12/1999 |

(Continued)

OTHER PUBLICATIONS

Korean Office Action for Korean Application No. 10-2019-7031435, dated Jan. 7, 2021, with Concise Statement of Relevance of Office Action, 7 pages.
International Search Report and Written Opinion for International Application No. PCT/JP2018/009398, dated May 15, 2018—5 pages.
Chinese Office Action for Chinese Application No. 201880020724.9, dated Oct. 22, 2020 with Concise Statement of Relevance of Office Action, 10 pages.
Non Final Office Action for U.S. Appl. No. 16/496,048, dated Apr. 5, 2022, 28 pages.
Restriction Requirement for U.S. Appl. No. 16/496,048, dated Jan. 19, 2022, 9 pages.

*Primary Examiner* — Daniel J. Schleis
(74) *Attorney, Agent, or Firm* — RatnerPrestia

(57) ABSTRACT

A steel sheet for a two-piece can, the steel sheet includes: by mass %, C: 0.010% or more and less than 0.030%; Si: 0.04% or less; Mn: 0.10% or more and less than 0.40%; P: 0.02% or less; S: 0.020% or less; Al: more than 0.030% and 0.100% or less; N: 0.0005% or more and less than 0.0030%; B: 0.0005% to 0.0030%; and balance Fe and inevitable impurities, wherein an amount of N that is present as BN and a whole amount of N satisfy the following expression (1):

$$[N \text{ as } BN]/[N] > 0.5 \qquad (1),$$

where N as BN represents the amount of N that is present as BN, and N represents the whole amount of N, a yield point is 280 MPa or more and less than 420 MPa, yield elongation is 3% or less, and Δr is −0.30 to 0.20.

8 Claims, No Drawings

(56) References Cited

FOREIGN PATENT DOCUMENTS

| | | |
|---|---|---|
| WO | 2016031234 A1 | 3/2016 |
| WO | 2016067514 A1 | 5/2016 |

* cited by examiner

STEEL SHEET FOR TWO-PIECE CAN AND MANUFACTURING METHOD THEREFOR

CROSS REFERENCE TO RELATED APPLICATIONS

This is the U.S. National Phase application of PCT/JP2018/009398, filed Mar. 12, 2018, which claims priority to Japanese Patent Application No. 2017-060541, filed Mar. 27, 2017, the disclosures of each of these applications being incorporated herein by reference in their entireties for all purposes.

FIELD OF THE INVENTION

The present invention relates to a steel sheet for a can that is suitable for application to a material for a can container used for fobd cans, beverage cans, aerosol cans, and the like, and a manufacturing method therefor, particularly to a steel sheet for a two-piece can having excellent processability and a manufacturing method therefor.

BACKGROUND OF THE INVENTION

From the standpoint of a recent environmental load reduction and cost reduction, reducing a used amount of steel sheets used for food cans, beverage cans, aerosol cans, and the like is required. For this reason, irrespective of a two-piece can and a three-piece can, reducing thickness of steel sheets as a material is advanced. In the processing on a two-piece can, when a sheet thickness of a can body part is made thinner by ironing processing in addition to drawing processing, a large load may be applied to a material and this load may cause defect in can manufacturing such as body burst. Thus, a steel sheet having small deformation resistance, in other words, having a low yield point, is suitable when processing the steel sheet to a can body especially having a high degree of processing. Furthermore, the processing into a two-piece can requires making an ear (earing) small enough in drawing processing and not generating stretcher strains. In order to ensure corrosion resistance, a request for omitting steps such as drying and baking necessary for a coating step and reducing energy costs by using a laminated steel sheet instead of coating a tin steel sheet and TFS steel sheet becomes strong.

For example, as a steel sheet for a two-piece can, Patent Literature 1 discloses a steel sheet for a drawn can having extremely excellent earing characteristics. The steel sheet for a drawn can has the composition consisting of, by weight %, C: 0.010-0.100%, Si: ≤0.35%, Mn: ≤1.0%, P: 0.070%, S: ≤0.025%, sol. Al: 0.005-0.100%, N: ≤0.0060%, B: B/N=0.5-2.5, and the balance Fe and inevitable impurities, and randomizes a crystal orientation of the steel sheet by defining a heating speed upon recrystallization annealing as 5° C./s or higher in a range where a sheet thickness t is 0.15-0.60 mm and a Δr value is +0.15--0.08.

Patent Literature 2 discloses a steel sheet for a two-piece container having excellent neck wrinkle resistance. The steel sheet for a two-piece container includes, by weight %, C: 0.01-0.05% and N: 0.004% or less, and satisfies (N existing as AlN)/(contained N)≥0.5.

As a laminated steel sheet for a two-piece can, Patent Literature 3 discloses a steel sheet for a resin coated steel sheet that is an original sheet used for a resin coated steel sheet suitable for use of a thinned deep drawn and ironed can. The components of the original sheet consist of C: 0.008-0.08%, Si≤0.05%, Mn≤0.9%, P≤0.04%, S≤0.04%, Al 0.03%, N≤0.0035%, the balance Fe and inevitable impurities, and an average crystal grain size of the original sheet before coating a resin is 8 μm or less and the maximum surface roughness (Rmax) is 5 μm or less.

As a steel sheet for a can having excellent processability, Patent Literature 4 discloses a steel sheet for a can having excellent processability and surface roughening resistance. The steel sheet for a can has component composition consisting of, by mass %, C: 0.010-0.050%, Si: not more than 0.03%, Mn: not more than 0.30%, P: not more than 0.02%, S: not more than 0.02%, Al: not more than 0.04%, N: not more than 0.004%, B: 0.0010-0.0025%, and the balance Fe and inevitable impurities. In the steel sheet for a can, a ferrite average crystal grain size is 10.0 μm or less, yield strength is 280 MPa or less, BN precipitate having a grain size of 80 nm or more and AlN precipitate having a grain size of 50 nm or less are included, and the content of the BN precipitate is equal to or more than the content of the AlN precipitate.

PATENT LITERATURE

Patent Literature 1: Japanese Patent Application Laid-open No. 2002-60900
Patent Literature 2: Japanese Patent Application Laid-open No. 10-280095
Patent Literature 3: International Publication
Patent Literature 4: Japanese Patent Application Laid-open No. 2014-208894

SUMMARY OF THE INVENTION

However, the conventional techniques described above have the following problems.

Patent Literature 1 discloses the fact that over-aging treatment is applied to a steel sheet for a can that is soft and has excellent aging resistance as a material other than an earing after continuous annealing with a box annealing method when the steel sheet for a can is manufactured. However, in the over-aging step of box annealing, sufficient softening and aging resistance cannot always be obtained in addition to great variation in a coil. Thus, with a steel sheet disclosed in Patent Literature 1, excellent formability is unlikely to be implemented in ironing processing. In addition, additional manufacturing costs are required in box annealing.

In a steel sheet disclosed in Patent Literature 2, a coarse nitride remains and a pin hole is generated because a slab heating temperature is 1,100° C. or lower. In addition, concrete expertise regarding a yield point for improving processability and an earing is not disclosed.

In a steel sheet disclosed in Patent Literature 3, because an additive amount of Al is as low as 0.03% or less, generation of AlN is insufficient and solid solution N remains. Thus, stretcher strains cannot sufficiently be reduced. In addition, information regarding a yield point and control of an earing is not disclosed.

In a steel sheet disclosed in Patent Literature 4, because yield strength is as low as 280 MPa or less, a bottom part of a can and the immediate vicinity of the bottom part of a can have insufficient can body strength. In addition, because a coiling temperature is as low as 540 to 590° C., anisotropy is large and a big earing is generated in drawing processing.

In view of the foregoing, an object of the present invention is to provide a steel sheet for a two-piece can having excellent formability in drawing processing and ironing processing and a manufacturing method therefor.

Inventors of the present invention have conducted keen research to solve the problems described above. Specifically, the inventors of the present invention have conducted keen research in order to find compatibility between earing characteristics and stretcher strain characteristics necessary for drawing processing and a yield point advantageous to ironing processing. After that, the inventors have found that the problems described above can be solved if component composition, Δr, and yield elongation are adjusted in a specific range and have completed the present invention based on this expertise.

To solve the problem and achieve the object, in a steel sheet for a two-piece can according to embodiments of the present invention, the steel sheet includes: by mass %, C: 0.010% or more and less than 0.030%; Si: 0.04% or less; Mn: 0.10% or more and less than 0.40%; P: 0.02% or less; S: 0.020% or less; Al: more than 0.030% and 0.100% or less; N: 0.0005% or more and less than 0.0030%; B: 0.0005% to 0.0030%; and balance Fe and inevitable impurities, wherein an amount of N that is present as BN and a whole amount of N satisfy the following expression (1):

$$[N\ as\ BN]/[N] > \qquad (1),$$

where N as BN represents the amount of N that is present as BN, and N represents the whole amount of N, a yield point is 280 MPa or more and less than 420 MPa, yield elongation is 3% or less, and Δr is −0.30 to 0.20.

Moreover, in the steel sheet for the two-piece can according to embodiments of the present invention, the sheet thickness is more than 0.20 mm and 0.40 mm or less.

Moreover, in the steel sheet for the two-piece can according to embodiments of the present invention, the steel sheet further includes: a film laminated layer having a thickness of 5 μm to 40 μm on both sides of the steel sheet or on a single side of the steel sheet.

Moreover, a method of manufacturing a Steel sheet according to embodiments of the present invention is the method including: heating a slab at a heating temperature of 1,100° C. or higher; hot-rolling, under the condition of a hot-rolling finish temperature of 820° C. to 920° C., the slab after the heating; coiling, at a coiling temperature of 600° C. to 700° C., a hot-rolled sheet obtained by the hot-rolling; pickling the hot-rolled sheet after the coiling; cold-rolling the hot-rolled sheet under the condition of a rolling reduction ratio of 85% or more after the pickling; annealing, under the condition of an annealing temperature of 650° C. to 750° C., a cold-rolled sheet obtained by the cold-rolling and performing an over-aging treatment where a retention time in a temperature range of 380° C. to 500° C. is 30 s or more; and rolling, under the condition of an elongation ratio of 0.5% to 2.0%, an annealed sheet obtained by the continuous annealing.

The present invention can provide a steel sheet for a two-piece can having excellent formability in drawing processing and ironing processing and a manufacturing method therefor.

DETAILED DESCRIPTION OF EMBODIMENTS OF THE INVENTION

The following describes a steel sheet for a two-piece can and a manufacturing method therefor according to the present invention.

Steel Sheet for a Two-Piece Can

A steel sheet for a two-piece can according to embodiments of the present invention includes, by mass %, C: 0.010% or more and less than 0.030%, Si: 0.04% or less, Mn: 0.10% or more and less than 0.40%, P: 0.02% or less, S: 0.020% or less, Al: more than 0.030% and 0.100% or less, N: 0.0005% or more and less than 0.0030%, B: 0.0005% to 0.0030%, and the balance Fe and inevitable impurities. An amount of N that is present as BN ([N as BN]) and the whole amount of N ([N]) satisfy the following expression (1).

$$[N\ as\ BN]/[N] > 0.5 \qquad (1)$$

A yield point of the steel sheet for a two-piece can according to embodiments of the present invention is more than 280 MPa and less than 420 MPa, yield elongation is 3% or less, and Δr is −0.30 to 0.20. Herein, Δr indicates an index for evaluating anisotropy of a material, and a value of Δr is calculated by the following expression (2) using a Lankford value ($r_0$) in a rolling direction, a Lankford value ($r_{45}$) in a direction at 45 degrees from the rolling direction, and a Lankford value ($r_{90}$) in a direction perpendicular to the rolling direction. The Lankford value for each direction can be measured by a method described in Japanese Industrial Standards (JIS) Z2254.

$$\Delta r = (r_0 + r_{90} - 2r_{45})/2 \qquad (2)$$

The following describes the steel sheet for a two-piece can according to embodiments of the present invention in order of component composition and physical properties. In the following description, "%" representing the content of each component indicates "mass %".

C: 0.010% or more and less than 0.030%

C is an important element for obtaining desirable yield point, yield elongation, and Δr at the same time. When the content of C is 0.030% or more, a yield point is 420 MPa or more and a forming load in ironing processing is excessive. In addition, solid solution C is likely to remain and yield elongation is larger than 3%, thereby causing stretcher strains. Furthermore, Δr decreases (increases in the negative direction), and a big earing is generated. Thus, an upper limit for the content of C is less than 0.030%, preferably 0.025% or less. By contrast, when the content of C is less than 0.010%, a yield point is 280 MPa or less, thereby making it difficult to ensure can body strength of a part having a low degree of processing in a can body. A ferrite grain size is excessively coarse at the time of annealing. When a steel sheet is made into a laminated steel sheet, surface roughening occurs at the time of can manufacturing, and adhesion between a film laminated layer and a steel sheet is reduced so as to reduce corrosion resistance. Thus, a lower limit for the content of C is 0.010% or more.

Si: 0.04% or less

If a large amount of Si is included, surface concentration causes surface treatment properties to be deteriorated, and corrosion resistance is reduced. In addition, solid solution strengthening causes a yield point to increase. Thus, an upper limit for the content of Si is 0.04% or less, preferably 0.03% or less.

Mn: 0.10% or more and less than 0.40%

Mn has an effect of improving a yield point of a steel sheet by solid solution strengthening, and is likely to ensure a yield point of 280 MPa or more. Mn forms MnS so as to prevent hot ductility caused by S included in steel from being reduced. Furthermore, stabilizing cementite contributes to decrease in amount of solid solution C and enables yield elongation to be stably reduced. In order to obtain these effects, a lower limit for the content of Mn needs to be 0.10% or more. By contrast, when the content of Mn is 0.40% or more, anisotropy is larger and an absolute value of Δr is larger. Thus, an upper limit for an amount of Mn needs to be less than 0.40%.

P: 0.02% or less

If a large amount of P is included, excessive hardening and central segregation causes formability to be reduced. In addition, if a large amount of P is included, corrosion resistance is reduced. Thus, an upper limit for the content of P is 0.02% or less. From a viewpoint for reducing a yield point, an upper limit for the content of P is preferably 0.015% or less.

S: 0.020% or less

S forms sulfide in a steel so as to reduce hot ductility. Thus, an upper limit for the content of S is 0.020% or less. By contrast, a lower limit for the content of S is preferably 0.008% or more because S has an effect of reducing pitting corrosion.

Al: more than 0.030% and 0.100% or less

Al forms N and AlN so as to reduce solid solution N in steel, reduce yield elongation, and reduce stretcher strains. Thus, a lower limit for the content of Al needs to be more than 0.030%. From a viewpoint for reducing yield elongation and improving can manufacturing properties, a lower limit for the content of Al is preferably 0.040% or more. By contrast, if the content of Al is excessive, a large amount of alumina is generated and the alumina remains in a steel sheet, thereby reducing can manufacturing properties. Thus, an upper limit for the content of Al needs to be 0.100% or less.

N: 0.0005% or more and less than 0.0030%

If N exists as solid solution N, yield elongation increases and stretcher strains are generated at the time of drawing processing, and surface appearance is defective. In addition, because a sheet thickness is uneven, this uneven sheet thickness is a factor of trouble in can manufacturing in a next step, and can manufacturing properties are reduced. Thus, an upper limit for the content of N is less than 0.0030%, preferably 0.0025% or less. By contrast, it is difficult to stably define the content of N as less than 0.0005%. If the content of N is less than 0.0005%, manufacturing costs are also increased. Thus, a lower limit for the content of N is 0.0005% or more.

B: 0.0005% to 0.0030% [N as BN]/[N]>0.5]

B forms BN with N so as to reduce solid solution N and reduce yield elongation. Thus, B is preferably included, and a lower limit for the content of B needs to be 0.0005% or more in order to obtain an effect of additive B. By contrast, if B is excessively included, not only the effect described above is saturated, but also anisotropy is deteriorated and an absolute value of Δr is larger so as to generate an earing. Thus, an upper limit for the content of B is 0.0030% or less. In addition, making the ratio [N as BN]/[N] between an amount of N existing as BN [N as BN] and the whole content of N [N] more than 0.5 enables yield elongation to be 3% or less and a yield point to be reduced to less than 420 MPa. Preferably, [N as BN]/[N]≥0.6.

The balance other than the essential components described above is Fe and inevitable impurities.

Yield point: more than 280 MPa and less than 420 MPa

Defining an upper limit for a yield point as less than 420 MPa enables a forming load at the time of ironing processing to be reduced and effective can manufacturing. An upper limit for a yield point is preferably 360 MPa or less, more preferably, 320 MPa or less. By contrast, in a two-piece can, because processing hardening of a bottom part of a can and the immediate vicinity of the bottom part of a can is small, it is difficult to ensure can body strength for the bottom part of a can and the immediate vicinity of the bottom part of a can if a lower limit for a yield point is 280 MPa or less. Thus, a lower limit for a yield point is more than 280 MPa.

Yield elongation: 3% or less

If a yield elongation is 3% or less, generation of stretcher strains in drawing processing can be reduced. More preferably, a yield elongation is 2% or less.

Δr: −0.30 to 0.20

In order to reduce generation of an earing in drawing processing, an absolute value of in-plane anisotropy Δr of a Lankford value (r value) as an index of plastic anisotropy needs to be small, and generation of an earing is considered as practically a non-problematic level if the in-plane anisotropy Δr is −0.30 to 0.20. Preferably, the in-plane anisotropy Δr is −0.15 to 0.15. In addition, from a viewpoint for improving drawing processing properties, an average Lankford value (average r value) is preferably 1.1 or more. Furthermore, each of the r values in rolling direction, in a direction at 45 degrees from the rolling direction, and a direction perpendicular to the rolling direction is preferably 1.0 or more. An average r value is a value calculated by the following expression (3) using a Lankford value ($r_0$) in a rolling direction, a Lankford value ($r_{45}$) in a direction at 45 degrees from the rolling direction, and a Lankford value ($r_{90}$) in a direction perpendicular to the rolling direction.

$$\text{Average r value} = (r_0 + 2r_{45} + r_{90})/4 \tag{3}$$

In addition to the description described above, the following is preferably defined.

Sheet thickness: more than 0.20 mm and 0.40 mm or less

When a sheet thickness is as thin as 0.20 mm or less, a can body thickness after drawing processing and ironing processing is too thin and can body strength is insufficient. Thus, a lower limit for a sheet thickness is more than 0.20 mm, preferably 0.21 mm or more. By contrast, when a sheet thickness is more than 0.40 mm, an effect of reduction in weight of a can body is not sufficiently obtained. Thus, an upper limit for a sheet thickness is 0.40 mm or less. Herein, a sheet thickness indicates a thickness of a steel sheet. When a steel sheet is a laminated steel sheet including a film laminated layer, a sheet thickness indicates a thickness of an original sheet that does not include the film laminated layer.

Film laminated layer having a thickness of 5 μm to 40 μm on both sides or a single side of a steel sheet Because a coating step can be omitted and corrosion resistance can be ensured, it is preferable that a film laminated layer having a thickness of 5 μm to 40 μm be preferably attached on both sides or a single side of a steel sheet according to embodiments of the present invention so as to make the steel sheet into a laminated steel sheet. When a thickness of a film laminated layer is less than 5 μm, sufficient corrosion resistance is not obtained after can manufacturing. Thus, a lower limit for the thickness is 5 μm or more. By contrast, even when a thickness of a film laminated layer is more than 40 μm, not only an effect is saturated, but also manufacturing costs are increased. Thus, an upper limit for the thickness is 40 μm or less.

Manufacturing Method for a Steel Sheet for a Two-Piece Can

Heating temperature: 1,100° C. or higer

A heating step is a step for heating a slab at a heating temperature of 1,100° C. or higher. If a heating temperature before hot rolling is too low, a part of the nitride is undissolved. This undissolution is a factor of generation of coarse AlN reducing can manufacturing. Thus, a heating temperature in a heating step is 1,100° C. or higher, preferably 1,130° C. or higher. An upper limit for a heating temperature is not particularly specified, but scale is excessively generated and a product surface becomes defective if the heating temperature is too high. Thus, an upper limit for a heating temperature is preferably 1,250° C.

Hot-rolling finish temperature: 820° C. to 920° C.

If a hot-rolling finish temperature is lower than 820° C., anisotropy is larger and an absolute value of Δr is larger, thereby reducing can manufacturing properties. Thus, a lower limit for a hot-rolling finish temperature is 820° C. or higher, preferably 850° C. or higher. By contrast, if a hot-rolling finish temperature is higher than 920° C., a ferrite grain size on a hot-rolled sheet is coarse, a ferrite grain size on an annealed sheet is coarse, and a yield point decreases. Thus, an upper limit for a hot-rolling finish temperature is 920° C. or lower.

Coiling temperature: 600° C. to 700° C.

When a coiling temperature is higher than 700° C., a ferrite grain size of a hot-rolled sheet is coarse, a ferrite grain size of the annealed sheet is excessively coarse, and a yield point decreases. Thus, an upper limit for a coiling temperature is 700° C. or lower. By contrast, when a coiling temperature is lower than 600° C., generation of carbide on a hot-rolled sheet is insufficient and an amount of solid solution C in the hot-rolled sheet increases, and an absolute value of Δr of the annealed sheet is larger and an earing is generated at the time of drawing processing. Thus, a lower limit for a coiling temperature is 600° C. or higher, more preferably 640° C. or higher, and further preferably higher than 650° C.

Pickling

A pickling step is a step for pickling a hot-rolled sheet after a coiling step. As a pickling condition, removing a surface scale would be enough, and the condition is not particularly specified. Pickling can be done by a conventional method.

Cold rolling: rolling reduction ratio of 85% or more

A rolling reduction ratio of cold rolling is an important manufacturing condition for making an absolute value of Δr small in order to prevent generation of an earing at the time of drawing processing. If a rolling reduction ratio of cold rolling is less than 85%, Δr increases in the positive direction. Thus, a lower limit for a rolling reduction ratio of cold rolling is 85% or more. By contrast, if a rolling reduction ratio in cold rolling is too large, Δr increases in the negative direction and an earing may be generated. Thus, an upper limit for a rolling reduction ratio of cold rolling is preferably 90% or less.

Annealing temperature: 650° C. to 750° C., over-aging temperature zone: 380° C. to 500° C., retention time in the over-aging temperature zone: 30s or more In order to sufficiently recrystallize ferrite grains during annealing and form a texture having small anisotropy, and in order to dissolve the carbide once and reprecipitate the carbide in over-aging treatment, which will be described later, a low limit for an annealing temperature is 650° C. or higher, preferably 680° C. or higher, more preferably higher than 690° C. From a viewpoint for reducing a yield point, a lower limit for an annealing temperature is further preferably higher than 720° C. By contrast, when an annealing temperature is too high, a ferrite grain size is coarse, and a yield point dramatically decreases. Thus, an upper limit for an annealing temperature needs to be 750° C. or lower. In addition, from a viewpoint for uniformily heating a steel sheet in a coil, an annealing time is preferably 15 s or more.

Subsequently, an annealed sheet is cooled from an annealing temperature to an over-aging temperature zone that is 380° C. to 500° C., over-aging treatment for retention time of 30 s or more in the over-aging temperature zone is performed. When an upper limit for an over-aging temperature is higher than 500° C., formation of carbide does not progress, solid solution C remains, and yield elongation is larger, thereby causing stretcher strains. In addition, a yield point excessively increases. Thus, an upper limit for an over-aging temperature zone is 500° C. or lower. By contrast, even when an over-aging temperature is too low, formation of carbide does not progress, solid solution C remains, and yield elongation is larger, thereby causing stretcher strains. Thus, a lower limit for an over-aging temperature zone needs to be 380° C. or higher. In an over-aging temperature zone that is 380° C. to 500° C., carbide is retained for a constant time, and the carbide is reprecipitated through over-aging, an amount of solid solution C is reduced, and yield elongation is reduced. When a retention time is short in an over-aging temperature zone, formation of carbide does not progress and an effect of over-aging is small. Thus, a retention time is 30 s or more. From a viewpoint for reducing yield elongation and decreasing a yield point, a cooling speed from an annealing temperature to an over-aging temperature zone is preferably 40° C./s or more so as to advance formation of carbide.

Skin-pass rolling: elongation ratio 0.5% to 2.0%

In order to decrease yield elongation, a lower limit for an elongation ratio is 0.5% or more. By contrast, if an elongation ratio is too large, a yield point increases. Thus, an upper limit for an elongation ratio is 2.0% or less. From a viewpoint for obtaining a low yield point, an upper limit for an elongation ratio is preferably less than 1.5%. From a viewpoint for decreasing an absolute value of Δr, the whole cold-rolling reduction ratio that combines cold rolling with skin-pass rolling ((hot-rolling thickness—sheet thickness after skin-pass rolling)/hot-rolling thickness×100) is preferably 90.0% or less.

As described above, a steel sheet for a two-piece can according to the present invention is obtained. As surface treatment of a steel sheet, Sn plating, Ni plating, Cr plating, and the like may be applied to the steel sheet. In addition, chemical conversion treatment and organic films such as laminate may be applicable. Specifically, when a laminated steel sheet is used, electrolytic Cr acid treatment is preferably applied to a surface of the steel sheet.

Embodiment

Steel including components of steel symbols A to P illustrated in the following TABLE 1 and having the balance consisting of Fe and inevitable elements was smelted so as to obtain a steel slab. Using conditions illustrated in the following TABLE 2, the obtained steel slab was heated, was hot-rolled, was wound, and was pickled so as to remove a scale. After that, the steel slab was cold-rolled, was annealed in a continuous annealing furnace and was subjected to over-aging treatment in an over-aging temperature zone that was 380° C. to 500° C., and was temper-rolled so as to obtain steel sheets (steel sheets No. 1 to 29) having a sheet thickness of 0.20 mm to 0.30 mm. After electrolytic Cr acid treatment as surface treatment was applied to the steel sheets described above, PET film having a thickness of 20 μm was thermally fused and adhered to both sides of the steel sheets so as to manufacture laminated steel sheets. The manufactured laminated steel sheets were evaluated with the following items 1 to 4.

1. [N as BN]

After the organic films were removed from the laminated steel sheets using concentrated sulfuric acid, the steel sheets were dissolved in bromine-methanol solution, a residue was decomposed in a sulfuric acid and phosphoric acid mixed solution, an amount of B in the solution was measured. Considering that the obtained amount of B formed the whole amount of BN, the obtained amount of B was converted into an amount of N.

2. Yield Point, Elongation, and Yield Elongation

After PET films were removed from the laminated steel sheets using concentrated sulfuric acid, a tensile test by JIS No. 5 was obtained from a rolling direction, and yield points, elongation (whole elongation), and yield elongation were evaluated along with JIS Z2241.

3. Δr

After PET films were removed from the laminated steel sheets using concentrated sulfuric acid, tensile test pieces by JIS No. 5 were cut out about a rolling direction, a direction at 45 degrees from the rolling direction, and a direction perpendicular to the rolling direction, and Δr was measured by the plastic strain ratio testing method (tensile method) disclosed in JIS Z2254.

4. Can Manufacturing Evaluation

In order to evaluate can manufacturing properties, the laminated steel sheets were punched out into a round shape, and a cylindrical cup was formed by drawing processing of a drawing ratio 1.88. A height of the cup edge part was measured at intervals of 15 degrees, and an earing rate was calculated by (maximum edge height−minimum edge height)/average edge height×100. When the earing rate was 3% or less, evaluation was defined as "◯", when the earing rate was 2% or less, evaluation was defined as "⊚", and when the earing rate was more than 3%, evaluation was defined as "×". In addition, when a cup was visually observed, the cup in which stretcher strains were hardly seen was defined as "⊚", the cup in which minor stretcher strains were seen was defined as "◯", and the cup in which noticeable stretcher strains were seen was defined as "×".

The following TABLE 3 shows an evaluation result. All of the examples had the yield point of 280 MPa to 420 MPa, the yield elongation of 3% or less, and Δr of −0.3 to 0.2, and had excellent processability in drawing processing and ironing processing. By contrast, in comparison examples, one or more of the characteristics was/were inferior. From the above, it was confirmed that the present invention could provide a steel sheet for a two-piece can having excellent formability in drawing processing and ironing processing and a manufacturing method therefor.

TABLE 1

| Steel symbol | C | Si | Mn | P | S | Al | N | B | Remark |
|---|---|---|---|---|---|---|---|---|---|
| A | 0.021 | 0.01 | 0.17 | 0.014 | 0.009 | 0.051 | 0.0023 | 0.0021 | Example |
| B | 0.010 | 0.02 | 0.19 | 0.015 | 0.008 | 0.044 | 0.0024 | 0.0018 | Example |
| C | 0.028 | 0.03 | 0.15 | 0.013 | 0.012 | 0.053 | 0.0018 | 0.0014 | Example |
| D | 0.018 | 0.01 | 0.39 | 0.015 | 0.013 | 0.045 | 0.0018 | 0.0012 | Example |
| E | 0.015 | 0.02 | 0.10 | 0.015 | 0.015 | 0.045 | 0.0020 | 0.0020 | Example |
| F | 0.019 | 0.03 | 0.30 | 0.016 | 0.011 | 0.035 | 0.0021 | 0.0010 | Example |
| G | 0.025 | 0.02 | 0.21 | 0.012 | 0.011 | 0.043 | 0.0026 | 0.0030 | Example |
| H | 0.022 | 0.03 | 0.18 | 0.010 | 0.009 | 0.032 | 0.0012 | 0.0021 | Example |
| I | 0.020 | 0.01 | 0.15 | 0.016 | 0.009 | 0.035 | 0.0023 | 0.0018 | Example |
| J | 0.018 | 0.02 | 0.16 | 0.016 | 0.012 | 0.063 | 0.0029 | 0.0026 | Example |
| K | 0.018 | 0.01 | 0.22 | 0.014 | 0.013 | <u>0.012</u> | 0.0030 | 0.0016 | Comparison example |
| L | 0.026 | 0.02 | 0.22 | 0.014 | 0.008 | 0.054 | <u>0.0056</u> | 0.0024 | Comparison example |
| M | <u>0.003</u> | 0.01 | 0.26 | 0.012 | 0.010 | 0.043 | 0.0028 | 0.0018 | Comparison example |
| N | <u>0.052</u> | 0.02 | 0.22 | 0.013 | 0.010 | 0.050 | 0.0026 | 0.0016 | Comparison example |
| O | 0.016 | 0.03 | <u>0.55</u> | 0.016 | 0.005 | 0.042 | 0.0017 | 0.0020 | Comparison example |
| P | 0.024 | 0.02 | 0.32 | 0.018 | 0.009 | <u>0.018</u> | 0.0024 | 0.0019 | Comparison example |

TABLE 2

| Steel sheet No. | Steel symbol | Slab heating temperature ° C. | Hot-rolling finish temperature ° C. | Coiling temperature ° C. | Hot-rolling thickness mm | Cold-rolling ratio % | Annealing temperature ° C. | Annealing time s | Over-aging time s | Elongation ratio of skin-pass % | Sheet thickness after skin-pass rolling mm | Total cold-rolling ratio % | Remark |
|---|---|---|---|---|---|---|---|---|---|---|---|---|---|
| 1 | A | 1160 | 870 | 650 | 2.0 | 88.8 | 700 | 20 | 50 | 1.4 | 0.22 | 89.0 | Example |
| 2 | A | 1160 | 790 | 630 | 2.0 | 88.3 | 700 | 20 | 50 | 1.6 | 0.23 | 88.5 | Comparison example |
| 3 | A | 1150 | 860 | 570 | 2.0 | 88.3 | 680 | 30 | 80 | 1.6 | 0.23 | 88.5 | Comparison example |
| 4 | A | 1150 | 850 | 720 | 2.0 | 87.3 | 680 | 30 | 80 | 1.4 | 0.25 | 87.5 | Comparison example |
| 5 | A | 1150 | 880 | 650 | 1.8 | 83.1 | 680 | 30 | 50 | 1.4 | 0.30 | 83.3 | Comparison example |
| 6 | A | 1170 | 870 | 650 | 1.6 | 87.6 | 620 | 20 | 50 | 1.2 | 0.22 | 87.8 | Comparison example |
| 7 | A | 1170 | 870 | 620 | 1.8 | 87.6 | 800 | 20 | 40 | 1.4 | 0.22 | 87.8 | Comparison example |
| 8 | A | 1170 | 860 | 620 | 1.8 | 87.6 | 720 | 10 | 15 | 1.4 | 0.22 | 87.8 | Comparison example |
| 9 | B | 1180 | 890 | 660 | 2.0 | 88.4 | 690 | 25 | 60 | 1.0 | 0.23 | 88.5 | Example |
| 10 | C | 1170 | 840 | 640 | 1.8 | 88.7 | 750 | 25 | 60 | 1.4 | 0.20 | 88.9 | Example |
| 11 | D | 1180 | 870 | 650 | 2.0 | 87.8 | 700 | 15 | 30 | 1.4 | 0.24 | 88.0 | Example |
| 12 | E | 1180 | 870 | 620 | 1.8 | 87.6 | 720 | 15 | 30 | 1.2 | 0.22 | 87.8 | Example |
| 13 | F | 1150 | 880 | 650 | 2.0 | 88.9 | 720 | 40 | 120 | 1.2 | 0.22 | 89.0 | Example |
| 14 | G | 1160 | 850 | 650 | 2.4 | 87.4 | 660 | 40 | 120 | 1.0 | 0.30 | 87.5 | Example |

TABLE 2-continued

| Steel sheet No. | Steel symbol | Slab heating temperature °C. | Hot-rolling finish temperature °C. | Coiling temperature °C. | Hot-rolling thickness mm | Cold-rolling ratio % | Annealing temperature °C. | Annealing time s | Over-aging time s | Elongation ratio of skin-pass % | Sheet thickness after skin-pass rolling mm | Total cold-rolling ratio % | Remark |
|---|---|---|---|---|---|---|---|---|---|---|---|---|---|
| 15 | H | 1130 | 850 | 700 | 2.0 | 87.9 | 710 | 20 | 60 | 0.5 | 0.24 | 88.0 | Example |
| 16 | I | 1160 | 870 | 650 | 2.0 | 88.8 | 700 | 20 | 50 | 1.4 | 0.22 | 89.0 | Example |
| 17 | J | 1160 | 870 | 600 | 2.0 | 88.8 | 650 | 15 | 30 | 2.0 | 0.22 | 89.0 | Example |
| 18 | K | 1160 | 870 | 650 | 2.0 | 88.8 | 700 | 20 | 50 | 1.4 | 0.22 | 89.0 | Comparison example |
| 19 | L | 1160 | 870 | 650 | 2.0 | 88.8 | 700 | 20 | 50 | 1.4 | 0.22 | 89.0 | Comparison example |
| 20 | M | 1160 | 870 | 650 | 2.0 | 88.8 | 700 | 20 | 50 | 1.4 | 0.22 | 89.0 | Comparison example |
| 21 | N | 1160 | 870 | 650 | 2.0 | 88.8 | 700 | 20 | 50 | 1.4 | 0.22 | 89.0 | Comparison example |
| 22 | O | 1160 | 870 | 650 | 2.2 | 89.9 | 700 | 20 | 50 | 1.4 | 0.22 | 90.0 | Comparison example |
| 23 | P | 1160 | 870 | 650 | 2.0 | 88.8 | 700 | 20 | 50 | 1.4 | 0.22 | 89.0 | Comparison example |
| 24 | A | 1160 | 870 | 650 | 2.0 | 89.4 | 725 | 20 | 50 | 1.2 | 0.21 | 89.5 | Example |
| 25 | G | 1160 | 850 | 650 | 2.0 | 89.4 | 740 | 40 | 120 | 1.2 | 0.21 | 89.5 | Example |
| 26 | J | 1160 | 870 | 600 | 2.0 | 88.8 | 730 | 15 | 30 | 1.4 | 0.22 | 89.0 | Example |
| 27 | A | 1160 | 870 | 670 | 2.0 | 88.8 | 700 | 20 | 50 | 1.4 | 0.22 | 89.0 | Example |
| 28 | I | 1160 | 870 | 680 | 2.0 | 88.9 | 740 | 20 | 50 | 1.0 | 0.22 | 89.0 | Example |
| 29 | E | 1180 | 880 | 670 | 1.8 | 87.0 | 730 | 15 | 30 | 1.4 | 0.23 | 87.2 | Example |

TABLE 3

| Steel sheet No. | [N as BN]/[N] | Yield point MPa | Yield elongation % | Δr | Earing rate (%) | Stretcher strain | Remark |
|---|---|---|---|---|---|---|---|
| 1 | 0.91 | 295 | 1.8 | −0.16 | ◎ (1.8) | ○ | Example |
| 2 | 0.88 | 304 | 2.0 | −0.52 | X (4.2) | ○ | Comparison example |
| 3 | 0.81 | 380 | 5.6 | −0.43 | X (3.6) | X | Comparison example |
| 4 | 0.90 | 260 | 1.5 | −0.18 | ○ (2.1) | ○ | Comparison example |
| 5 | 0.89 | 263 | 2.0 | 0.31 | X (3.6) | ○ | Comparison example |
| 6 | 0.90 | 440 | 1.2 | −0.48 | X (3.9) | ○ | Comparison example |
| 7 | 0.87 | 260 | 2.5 | −0.18 | ◎ (2.0) | ○ | Comparison example |
| 8 | 0.90 | 330 | 4.8 | −0.17 | ◎ (1.9) | X | Comparison example |
| 9 | 0.88 | 280 | 1.4 | −0.05 | ◎ (1.2) | ◎ | Example |
| 10 | 0.89 | 310 | 1.8 | −0.29 | ○ (2.6) | ○ | Example |
| 11 | 0.78 | 305 | 1.1 | −0.21 | ○ (2.4) | ◎ | Example |
| 12 | 0.95 | 300 | 0.8 | −0.15 | ◎ (1.8) | ◎ | Example |
| 13 | 0.52 | 286 | 2.6 | −0.22 | ○ (2.2) | ○ | Example |
| 14 | 0.88 | 340 | 1.6 | −0.19 | ○ (2.1) | ○ | Example |
| 15 | 0.92 | 290 | 0.6 | −0.10 | ◎ (1.5) | ◎ | Example |
| 16 | 0.87 | 310 | 2 | −0.18 | ◎ (2.0) | ○ | Example |
| 17 | 0.83 | 360 | 2.4 | −0.26 | ○ (2.6) | ○ | Example |
| 18 | 0.60 | 340 | 4.3 | −0.25 | ○ (2.3) | X | Comparison example |
| 19 | 0.36 | 455 | 6.7 | −0.43 | X (3.4) | X | Comparison example |
| 20 | 0.75 | 210 | 0.3 | 0.33 | X (3.8) | ◎ | Comparison example |
| 21 | 0.69 | 430 | 6.5 | −0.53 | X (4.3) | X | Comparison example |
| 22 | 0.94 | 346 | 1.7 | −0.44 | X (3.4) | X | Comparison example |
| 23 | 0.83 | 350 | 3.8 | −0.31 | X (3.2) | X | Comparison example |
| 24 | 0.91 | 283 | 0.9 | −0.12 | ◎ (1.6) | ◎ | Example |
| 25 | 0.88 | 310 | 1.2 | −0.15 | ◎ (1.7) | ◎ | Example |
| 26 | 0.83 | 305 | 0.9 | −0.10 | ◎ (1.4) | ◎ | Example |
| 27 | 0.96 | 290 | 1.3 | −0.15 | ◎ (1.7) | ◎ | Example |
| 28 | 0.91 | 280 | 0.6 | 0.10 | ◎ (1.1) | ◎ | Example |
| 29 | 0.95 | 280 | 0.4 | 0.15 | ◎ (1.6) | ◎ | Example |

The present invention can provide a steel sheet for a two-piece can having excellent formability in drawing processing and ironing processing and a manufacturing method therefor.

The invention claimed is:

1. A steel sheet for a two-piece can, the steel sheet comprising: by mass %, C: 0.010% or more and less than 0.030%; Si: 0.04% or less; Mn: 0.10% or more and less than 0.40%; P: 0.02% or less; S: 0.020% or less; Al: more than 0.030% and 0.100% or less; N: 0.0005% or more and less than 0.0030%; B: 0.0005% to 0.0030%; and balance Fe and inevitable impurities, wherein an amount of N that is present as BN and a whole amount of N satisfy the following expression (1):

$$[N \text{ as BN}]/[N] > 0.5 \tag{1},$$

where N as BN represents the amount of N that is present as BN, and N represents the whole amount of N, a yield point is 280 MPa or more and less than 420 MPa, yield elongation is 3% or less, and Δr is −0.30 to 0.20.

2. The steel sheet for a two-piece can according to claim 1, wherein a sheet thickness is more than 0.20 mm and 0.40 mm or less.

3. The steel sheet for a two-piece can according to claim 1, further comprising a film laminated layer having a thickness of 5 μm to 40 μm on both sides of the steel sheet or on a single side of the steel sheet.

4. The steel sheet for a two-piece can according to claim 2, further comprising a film laminated layer having a thickness of 5 μm to 40 μm on both sides of the steel sheet or on a single side of the steel sheet.

5. A method of manufacturing the steel sheet according to claim 1, the method comprising:

heating a slab at a heating temperature of 1,1000 or higher;

hot-rolling, under the condition of a hot-rolling finish temperature of 820° C to 920° C, the slab after the heating;

coiling, at a coiling temperature 600° C to 700° C hot-rolled sheet obtained by the hot-rolling;

pickling the hot-rolled sheet after the coiling;

cold-rolling the hot-rolled sheet under the condition of a rolling reduction ratio of 85% or more after the pickling;

annealing, under the condition of an annealing temperature of 650° C to 750° C, a cold-rolled sheet obtained by the cold-rolling and performing an over-aging treatment where a retention time in a temperature range of 380° C to 500° C is 30 s or more; and rolling, under the condition of an elongation ratio of 0.5% to 2.0%, an annealed sheet obtained by the continuous annealing.

6. The method of manufacturing the steel sheet according to claim 5, wherein a sheet thickness more than 0.20 mm and 0.40 mm or less.

7. The method of manufacturing the steel sheet according to claim 5, further comprising forming a film laminated layer having a thickness of 5 μm to 40 μm on both sides of the steel sheet or on a single side of the steel sheet.

8. The method of manufacturing the steel sheet according to claim 6, further comprising forming a film laminated layer having a thickness of 5 μm to 40 μm on both sides of the steel sheet or on a single side of the steel sheet.

* * * * *

UNITED STATES PATENT AND TRADEMARK OFFICE
CERTIFICATE OF CORRECTION

PATENT NO. : 11,486,018 B2
APPLICATION NO. : 16/495991
DATED : November 1, 2022
INVENTOR(S) : Hayato Saito Page 1 of 1

It is certified that error appears in the above-identified patent and that said Letters Patent is hereby corrected as shown below:

In the Claims

In Claim 5, Column 14, Line 3, "heating a slab at a heating temperature of 1,1000 or" should read -- heating a slab at a heating temperature of 1,100° C. or --

Signed and Sealed this
Twenty-fourth Day of January, 2023

Katherine Kelly Vidal
*Director of the United States Patent and Trademark Office*